United States Patent
Gallant et al.

(10) Patent No.: US 7,143,703 B2
(45) Date of Patent: Dec. 5, 2006

(54) COMBINATION SEED PLANTER AND GARDEN TOOL

(76) Inventors: Dennis Gallant, 10208 Cartha La., Harrison, OH (US) 45030; George Poole, 13008 Sparta Pike, Moores Hill, IN (US) 47032

( * ) Notice: Subject to any disclaimer, the term of this patent is extended or adjusted under 35 U.S.C. 154(b) by 0 days.

(21) Appl. No.: 11/040,128

(22) Filed: Jan. 21, 2005

(65) Prior Publication Data

US 2006/0162629 A1    Jul. 27, 2006

(51) Int. Cl.
*A01C 5/00*    (2006.01)

(52) U.S. Cl. .......................................... 111/92

(58) Field of Classification Search ................ 111/111, 111/117, 135, 167, 92, 106, 118; 7/114, 116
See application file for complete search history.

(56) References Cited

U.S. PATENT DOCUMENTS

| 419,928 | A | | 1/1890 | Claiborne |
| 643,524 | A | * | 2/1900 | Newman ....................... 111/92 |
| 1,287,516 | A | | 12/1918 | Theobald |
| 1,439,601 | A | | 12/1922 | Boop |
| 1,994,196 | A | | 3/1935 | McDonough |
| 2,767,820 | A | | 10/1956 | Ramsey |
| 2,865,315 | A | | 12/1958 | Goldstein |
| 3,097,759 | A | | 7/1963 | Jett |
| 4,218,981 | A | | 8/1980 | Kelly |
| 4,747,357 | A | * | 5/1988 | Kucera ......................... 111/92 |
| 5,471,939 | A | | 12/1995 | Chancey |
| 5,493,977 | A | | 2/1996 | Maisch |
| 5,497,713 | A | | 3/1996 | Anderson et al. |
| 6,279,496 | B1 | | 8/2001 | Mitchell et al. |
| 6,289,828 | B1 | | 9/2001 | Wittenberg |
| 6,662,736 | B1 | | 12/2003 | Lowe et al. |

OTHER PUBLICATIONS

Hobby Farm Magazine, Dec. 2004, Los Angelos, California (advertisement).

* cited by examiner

*Primary Examiner*—Christopher J. Novosad
(74) *Attorney, Agent, or Firm*—Lynnette Fledderman (57) ABSTRACT

A garden tool for planting seeds, comprising an elongate hollow cylinder through which a seed passes, a hopper attached to the first end of the cylinder through which the seed is dropped, an adjustable collar attached to the second end of the cylinder for measuring planting depth and, optionally, distance between planted seeds, a flange or hoe blade for furrowing or digging a planting row and for covering a planted seed, and optionally, an internal tray located in the hopper for holding seeds, and an adjustable elongate hollow cylinder.

9 Claims, 8 Drawing Sheets

COMBINATION SEED PLANTER AND GARDEN TOOL

TECHNICAL FIELD

The present invention is a combination seed planter and garden tool that alleviates the gardener's need to bend and to use multiple tools during the planting process.

BACKGROUND

Traditional gardening requires the use of hand tools such as a garden hoe to make the planting row and to cover the plant seeds. Individual seeds are generally placed by hand into the planting row for accurate placement and spacing for optimal growing conditions. This requires the gardener to continuously bend over to place each individual seed in the planting row causing fatigue and strain to the gardener's muscles.

As fatigue or pain intensifies, the gardener gradually assumes a more upright posture, reducing the accuracy of seed placement and spacing thereby compromising growing conditions. As a result, it is desirable to have a garden tool that eliminates the gardener's need to bend over for accurate placement and planting of seeds.

Furthermore, it would be advantageous to the gardener for the garden tool to combine several functions so that it may be used to dig the planting row and plant, space, and cover the seeds to eliminate the need to use separate tools during the planting process.

Information relevant to attempts to address these problems can be found in U.S. Pat. Nos. 5,497,713; 2,767,820; 4,218,981; 1,439,601; 6,662,736; 6,279,496; 5,471,939; 2,865,315; 6,289,828; 5,493,977; 3,097,759; 419,928; 1,287,516; and 1,994,196; the disclosure of which is expressly incorporated herein by reference. However, each one of these references suffers from one or more of the following disadvantages: fails to combine the ability to furrow and space, plant and cover seeds, costly design, increased maintenance, or requires bending during the planting process. None of these patents disclose or suggest the present invention.

For the foregoing reasons, what is needed is a combination seed planter and garden tool that is inexpensive and easy to maintain that has the ability to alleviate the need for the gardener to bend during the planting process and can function as multiple garden tools allowing the gardener to use one tool to furrow as well as space, plant and cover seeds.

SUMMARY

In one aspect, this invention is a garden tool for planting a seed. In general, the tool is an elongate hollow cylinder with a hopper attached to one end, and a collar that slides up and down to gauge the depth a seed is dropped. The hopper also includes a V-shaped flange and a rectangular shaped flange respectively for furrowing and covering seeds.

In another embodiment of this invention, the tool is an elongate hollow cylinder with a funnel-shaped hopper operably attached to one end, a collar that slides up and down to gauge the depth a seed is dropped, and a hoe blade attached to the outside surface of the elongate hollow cylinder for furrowing and covering seeds.

These and other features, aspects, and advantages of the present invention will become apparent upon reading the following detailed description of the invention and the appended claims in combination with the accompanying drawings.

DETAILED DESCRIPTION

Figure 1:
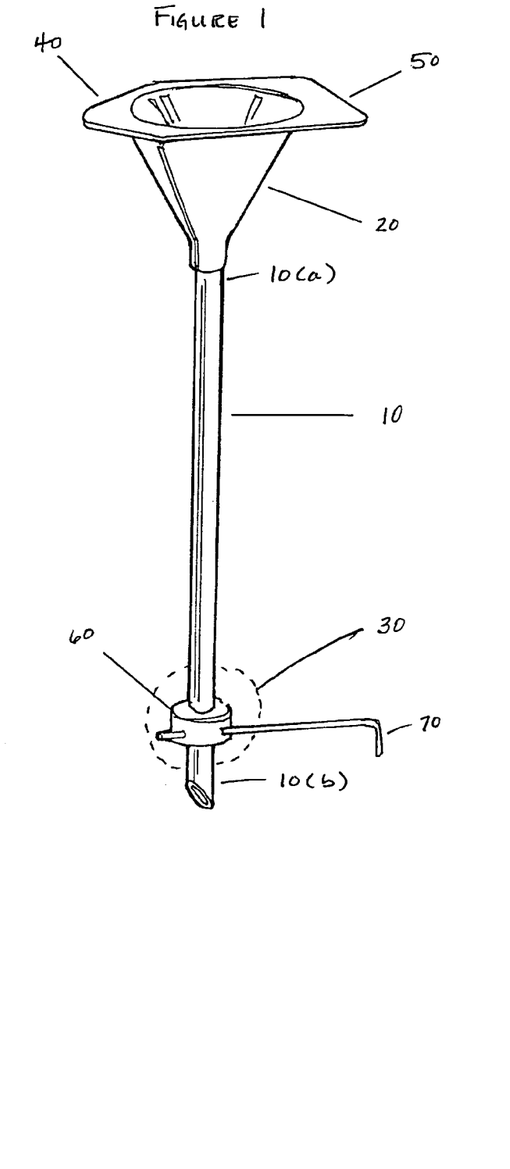
FIG. 1 is a perspective view of one preferred embodiment of a combination seed planter and garden tool embodying the invention with the hopper used for digging planting rows and covering planted seeds.
Figure 2:
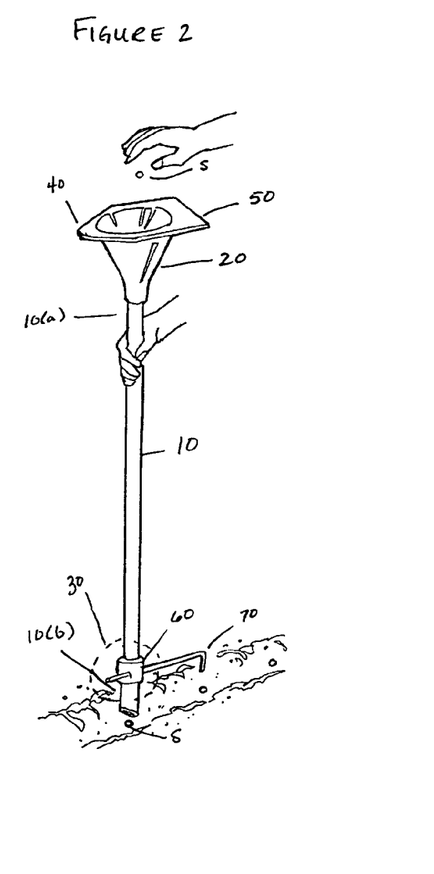
FIG. 2 is a perspective view of one preferred embodiment of a combination seed planter and garden tool embodying the invention with the hopper used for digging planting rows and covering planted seeds as in use during the planting operation.

Referring now to FIGS. 1 and 2, a combination seed planter and garden tool. The combination seed planter and garden tool generally includes an elongate hollow cylinder 10, a hopper 20 with a major end and a minor end, a means for measuring depth of a planted seed 30, and means for furrowing and covering a planted seed S. The cylinder 10 has a first end 10(a), a second end 10(b), and preferably a uniform passageway through which a seed S may pass from the cylinder's first end 10(a) to the cylinder's second end 10(b). The second end 10(b) of the cylinder 10 (as shown) may be angled so that the cylinder 10 may be easily inserted directly into the soil.

Figure 3A:
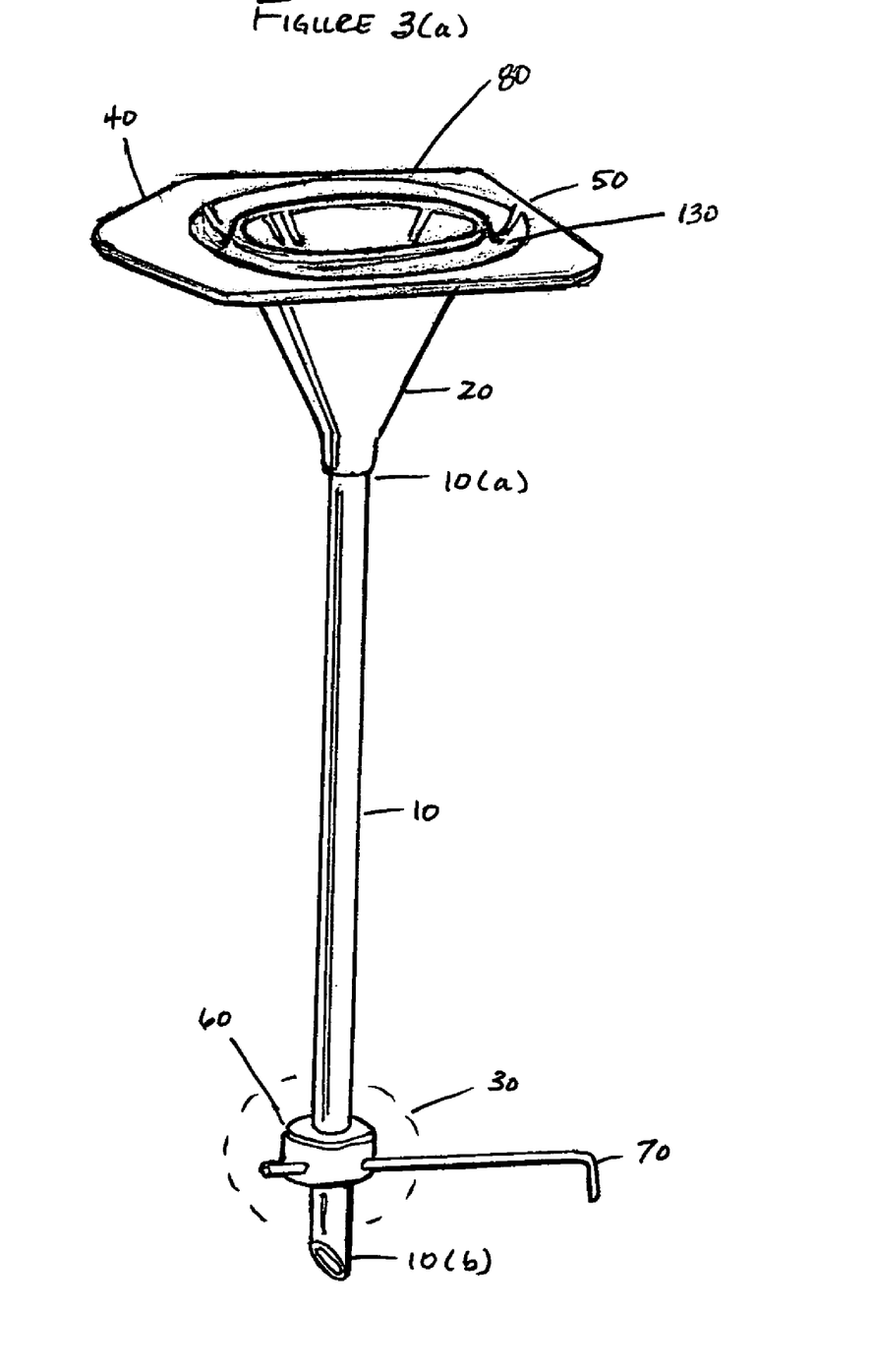
FIG. 3 is a partial perspective view of the hopper showing the V-shaped flange and the rectangular flange used in one preferred embodiment of the invention.
Figure 3B:
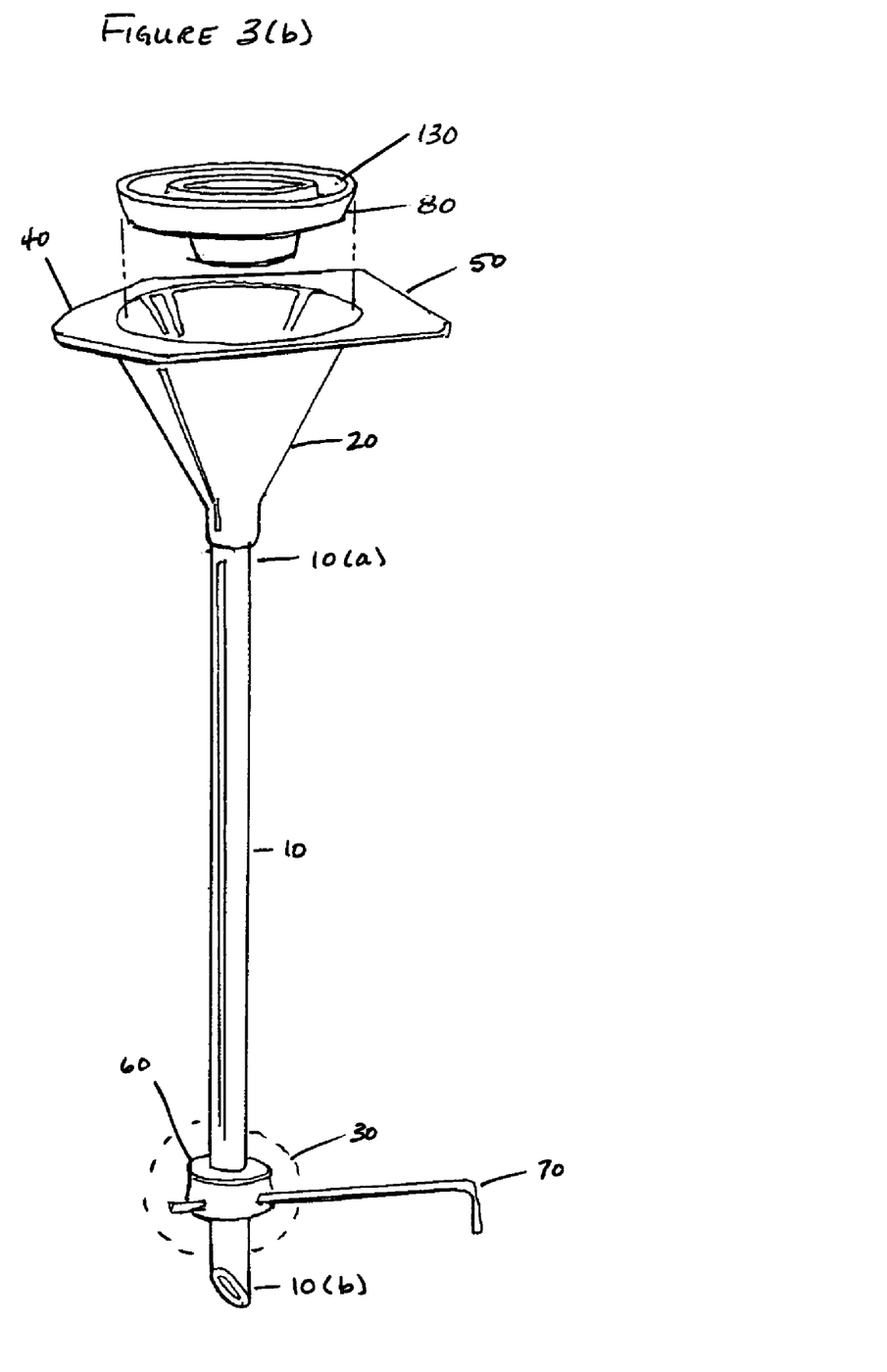

Referring now to FIG. 3 a hopper 20. Fastened to the first end 10(a) of the cylinder 10 is a hopper 20 providing an opening into which seed S is placed for planting. The hopper 20 may be molded to the first end 10(a) of the cylinder 10 or may be fastened to the first end 10(a) in any manner known to those of average skill in the art including but not limited to threaded fasteners, adhesives, epoxies, soldering or welding.

Figure 4:
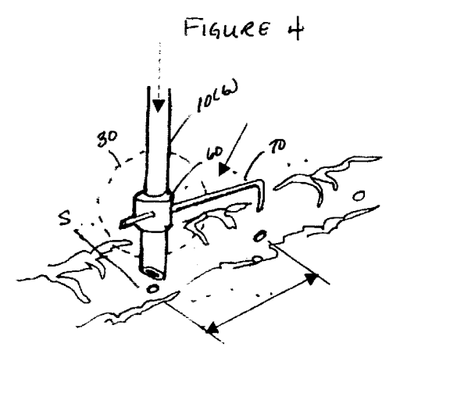
FIG. 4 is a partial perspective view of a means to measure distance for accurate space placement of seeds, used in one preferred embodiment of the invention.

Referring now to FIG. 4, a means for measuring depth 30 of a planted seed S, fastened to the second end of the cylinder 10(b). The means for measuring depth 30 of a planted seed S comprises an adjustable collar 60 fitted around the second end 10(b) of the cylinder 10 in a manner that allows the collar 60 to slide along the cylinder 10 longitudinally so that the collar 60 may be adjusted up and down to measure the depth of the planting row, and a means for measuring distance 70 between planted seeds S attached to the collar 60 in a manner that allows the means for measuring distance 70 to be slid through the collar 60 horizontally to adjust the means for measuring distance 70 between the planted seeds S. The collar 60 may be fastened to the second end 10(b) of the cylinder 10 in any manner known to those of average skill in the art that allows for longitudinal movement of the collar 60 along the cylinder 10, including but not limited to threaded fasteners, magnets, and friction.

Figures 5A, 5B:
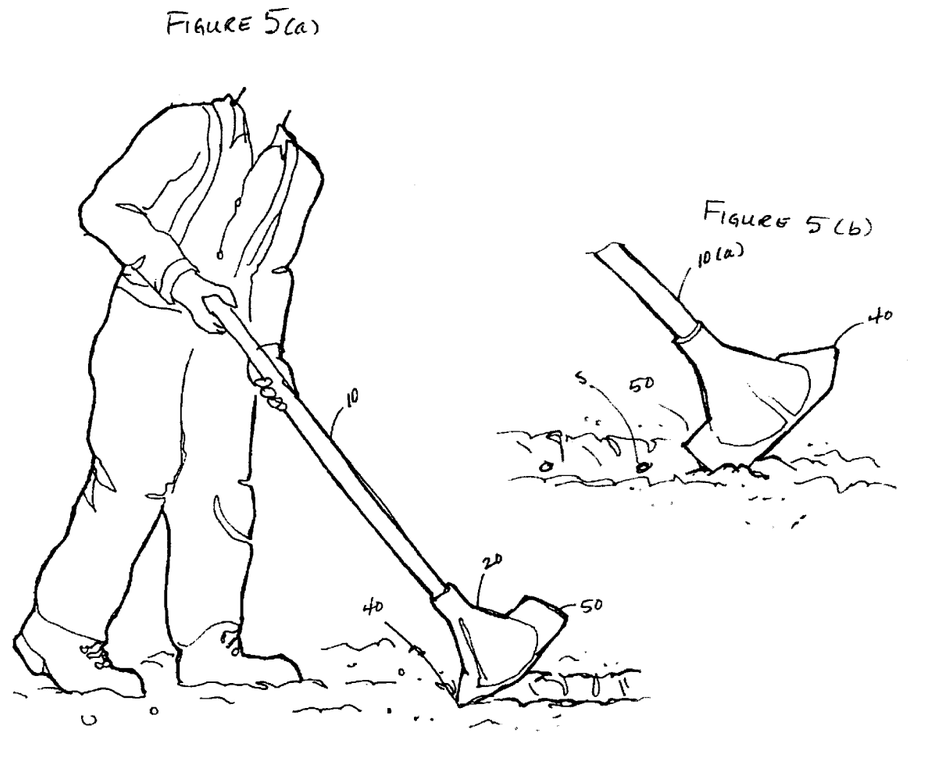
FIG. 5(a) is a perspective view of the V-shaped flange of the hopper as used for digging a planting row, according to one preferred embodiment of the invention.
FIG. 5(b) is a close-up perspective view of the rectangular flange of the hopper as used for covering a planted seed, according to one preferred embodiment of the invention.

Referring now to FIGS. 3, 5(a) and 5(b) a means for furrowing and covering a seed S. In one design of the invention, a means for furrowing and covering a seed S is provided by incorporating a flat V-shaped flange 40 for furrowing and a flat rectangular flange 50 for covering a seed S onto the hopper 20. Another design (as shown) for this hopper 20 comprises a V-shaped flange 40 on the outer rim of the hopper 20 and a rectangular shaped flange 50 on the outer rim of the hopper 20 situated directly opposite the V-shaped flange 40.

Figure 6:
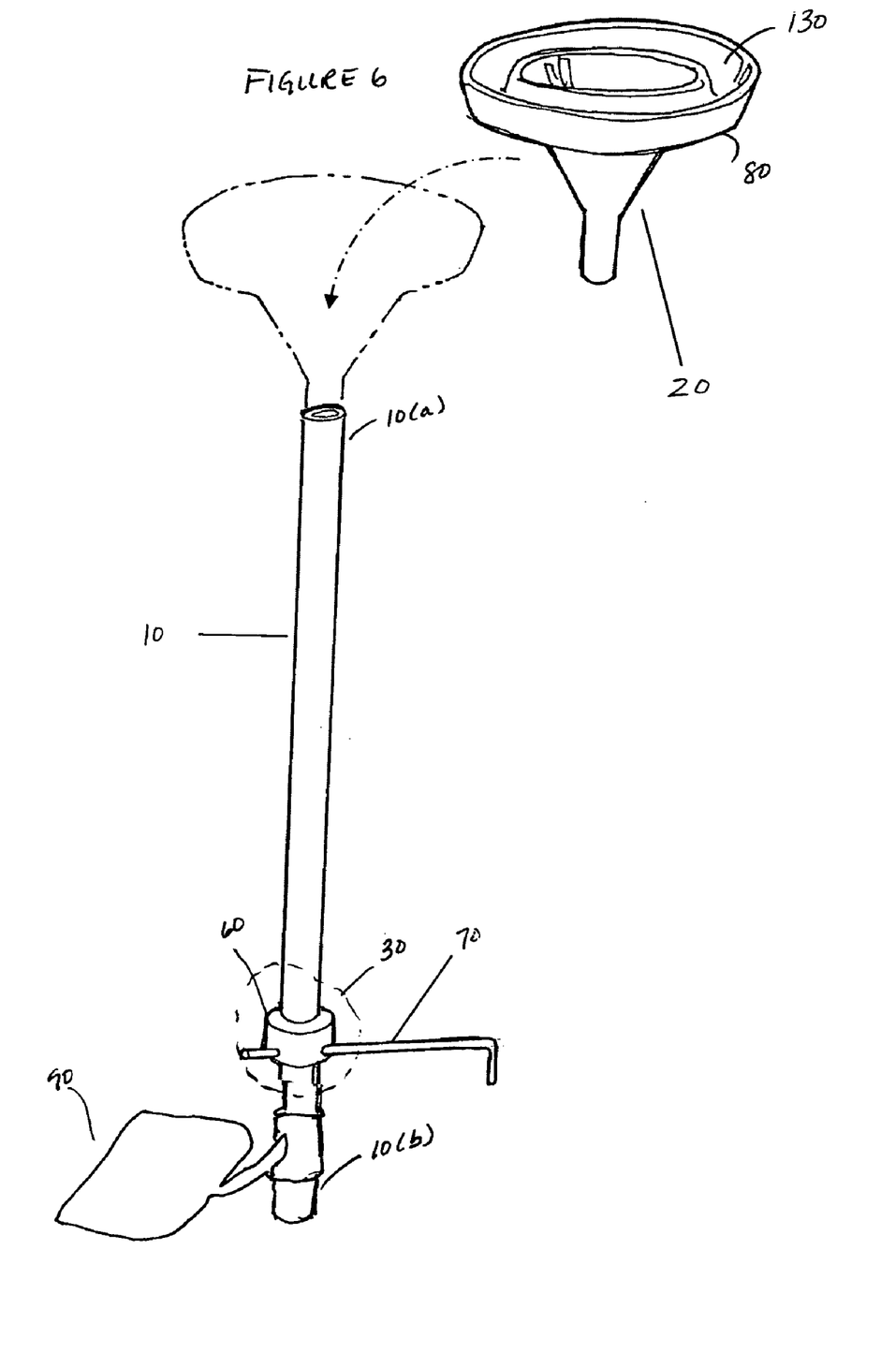
FIG. 6 is a perspective view of the combination seed planter and garden tool according to one preferred embodiment of the invention with an attached hoe blade used for digging planting rows and covering planted seeds and a "ghost" view of the removable hopper with internal tray fixed to the hopper.
Figures 7, 8:
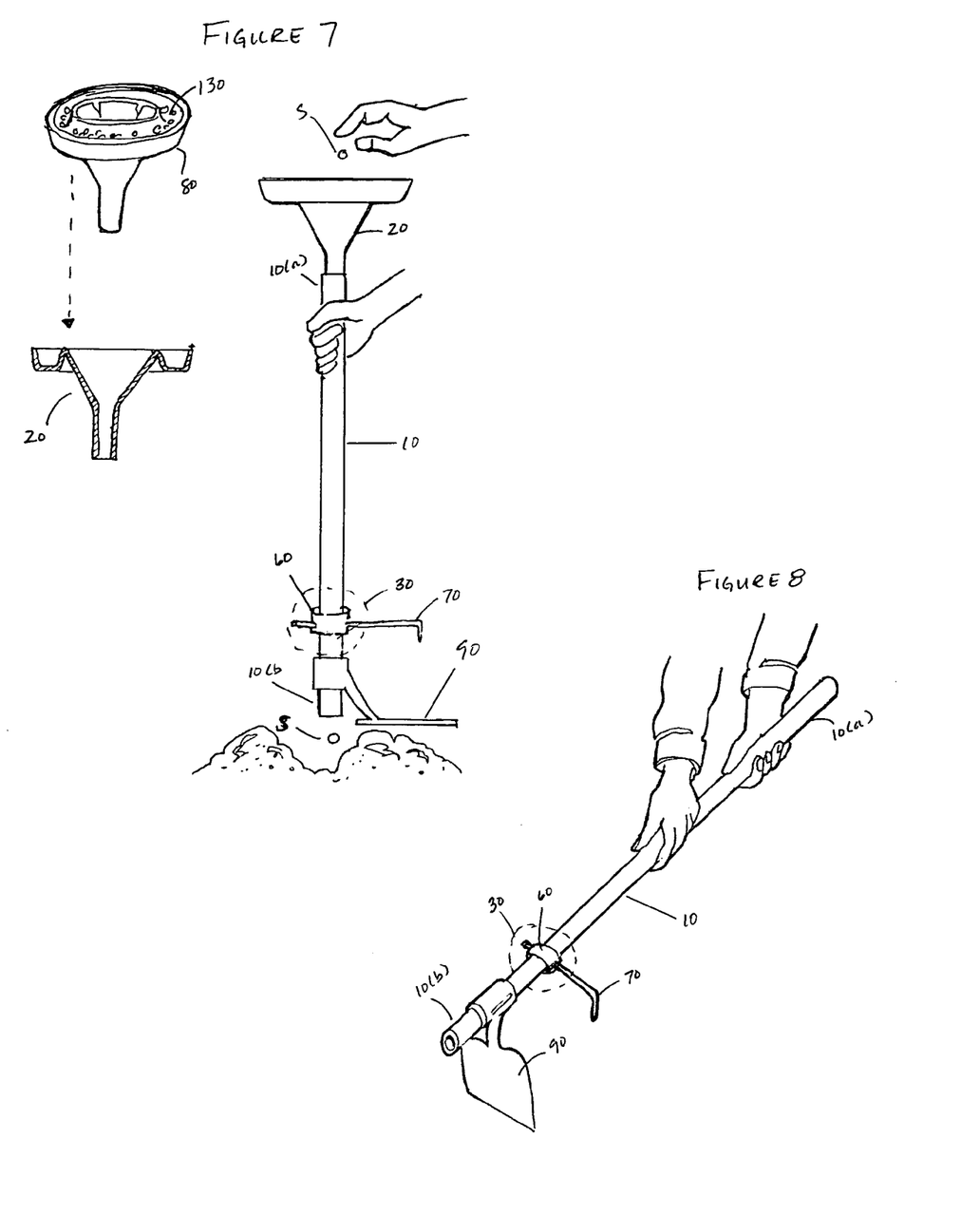
FIG. 7 is a perspective view of the combination seed planter and garden tool according to one preferred embodiment of the invention with the hoe blade for digging planting rows and covering planted seeds as in use during the planting operation and a partial sectional view of the removable internal tray to be placed in removable or attached hopper.
FIG. 8 is a perspective view of the combination seed planter and garden tool according to one preferred embodiment of the invention with a hoe blade for digging planting rows and covering planted seeds and detachable hopper as in use using the hoe blade with the hopper detached.

Referring now to FIGS. 6, 7, and 8, an alternate construction of the invention wherein a hoe blade 90 is the means for furrowing and covering a seed S. In an alternate design of the invention, a means for furrowing and covering the seed S is provided by a hoe blade 90 fastened between the second end 10(b) of the cylinder 10 and the means for measuring depth 30. The hoe blade 90 may be fastened to the second end 10(b) of the cylinder 10 in any manner known to those of average skill in the art including but not limited to threaded fasteners, adhesives, epoxies, soldering or welding.

In an alternate design of the invention, illustrated in FIGS. 6, 7, and 8, the hopper 20 is fastened to the first end 10(a) of the cylinder 10 in a manner in which the hopper 20 is removable by the user while the invention is used for furrowing or covering seeds S and replaceable when the invention is used for planting.

Referring now to FIG. 6, a hopper 20 with internal tray 80. The hopper 20 comprises an internal tray 80 fixed to the interior of the hopper 20 allowing seeds S to be carried in the internal tray 80 until dropped through the hopper 20 for planting. The internal tray 80 comprises a trough 130 sufficiently deep to hold seeds S and attached securely to the interior of the hopper 20, with, for example, an interlocking male-female connection.

Referring now to FIG. 7, a removable internal tray 80 for a hopper 20. A hopper 20 with a removable internal tray 80 may be used in designs of the invention comprising a hopper 20 without a fixed internal tray 80 on the inner rim. The removable internal tray 80 comprises a trough 130 sufficiently deep to hold seeds S and fitting securely in the interior of the hopper 20.

Figure 9:
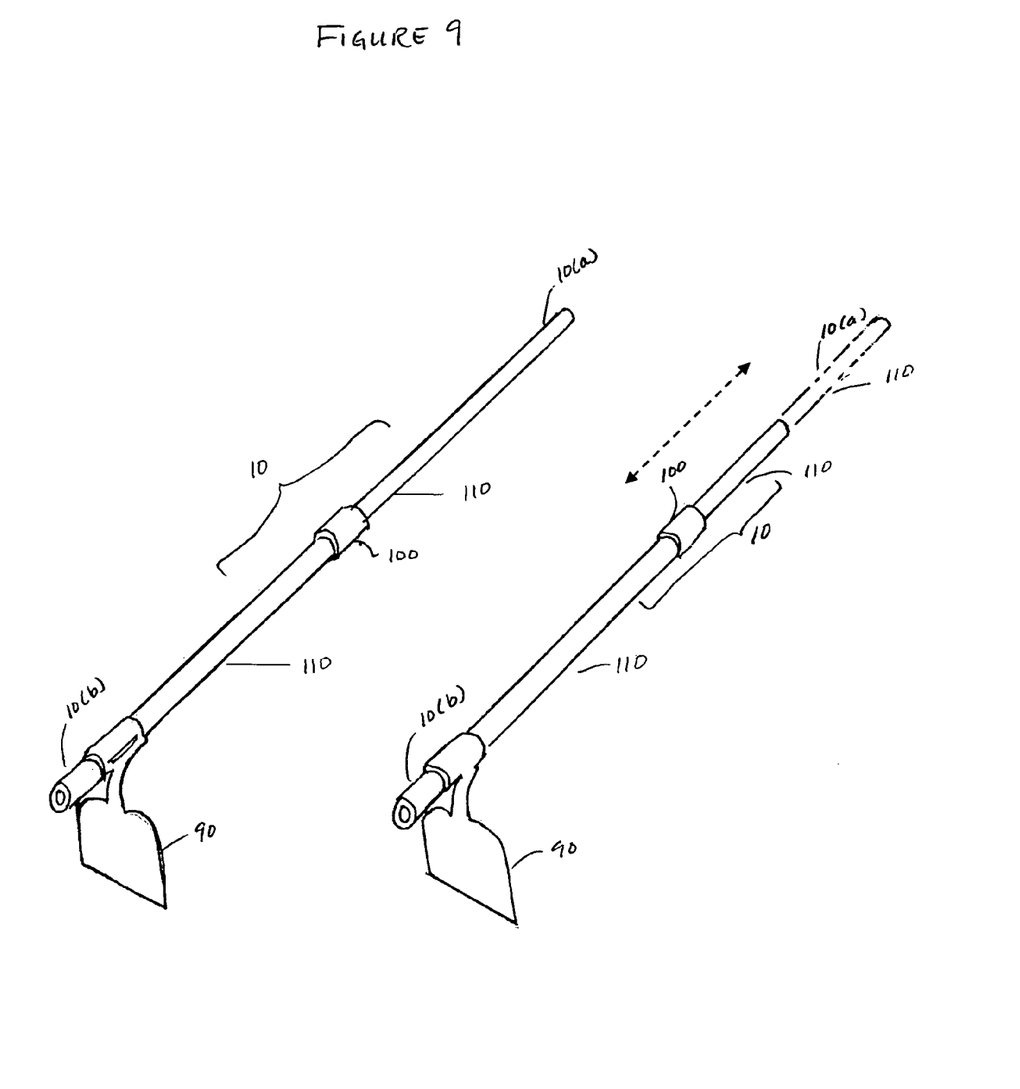
FIG. 9 is a partial perspective view of a telescoping elongate hollow cylinder that may be adjusted to change the length of the invention; according to one preferred embodiment of the invention.

Referring now to FIG. 9, a telescoping elongate hollow cylinder 10. A telescoping elongate hollow cylinder 10 comprising multiple telescoping segments 110 allowing a telescoping segment 110 to slide into the interior of an adjoining telescoping segment 110 and interlocking in a manner that allows the length of the cylinder 10 to be adjusted to a suitable length for the user. Telescoping segments 110 may be secured by a collar 100, threaded fastener, or in another manner known by those of average skill in the art.

Figure 10:
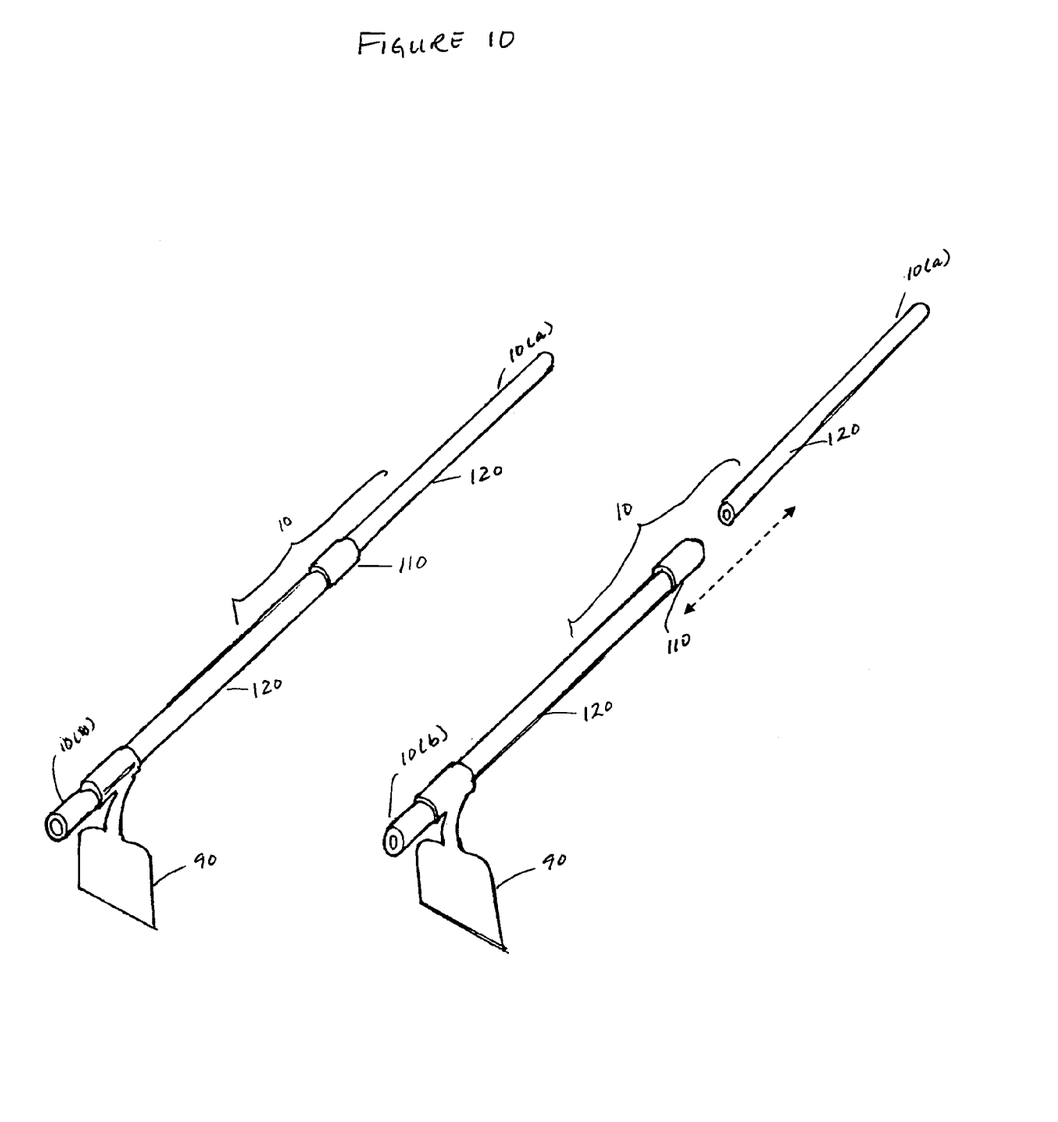
FIG. 10 is a partial perspective view of a segmented elongate hollow cylinder that may be adjusted to change the length of the invention; according to one preferred embodiment of the invention.

Referring now to FIG. 10, an adjustable elongate hollow cylinder 10. An adjustable elongated hollow cylinder 10 comprising multiple interlocking segments 120 fastened in a manner that allows the interlocking segments 120 to be inserted or removed to adjust the length of the cylinder 10 suitable for the user. The interlocking segments 120 may be fastened together in any manner known to those skilled in the art including but not limited to an interlocking collar 100 and threaded fasteners.

As any person skilled in the art will recognize what structures, materials, or acts perform the functions recited in this description.

To use the invention, the V-shaped flange, the hoe blade or other means for furrowing is used to dig a planting row to the optimal depth for seed germination. In cases where it is not necessary to dig a planting row, the second end of the cylinder may be inserted directly into the soil. The collar is adjusted along the elongate hollow cylinder so that when the second end of the hollow cylinder is placed into the planting row or the soil, the planting depth is measured. The means to measure distance between planted seeds attached to the collar is subsequently adjusted to the recommended distance between planted seeds.

Once the appropriate planting depth and distance between seeds is acquired, the gardener holds the invention vertically with the major end of the hopper attached to the first end of the cylinder facing up and the second end of the cylinder inserted into the planting row or directly into the soil. If the design of the invention used by the gardener has a removable internal tray, the internal tray may be inserted into the hopper at this time.

Individual seeds are then dropped into the hopper, passing through the elongate hollow cylinder and deposited in the planting row. The gardener continues using the invention in this manner measuring the distance between seeds. Once the desired number of seeds has been planted, the seeds are emptied from the fixed internal tray or the removable internal tray is removed from the hopper. The rectangular flange, hoe blade or other means for covering seeds is then utilized to close the planting row.

If the embodiment of the invention being used by the gardener has a telescoping elongate hollow cylinder or an elongate hollow cylinder made of interlocking segments, the length of the cylinder may be adjusted during the various steps of use for the user's comfort.

The invention may be constructed from any durable material and is preferably constructed from an inexpensive, light weight, rust proof material including but not limited to plastic, fiberglass, or a combination thereof. The preferred embodiments of the invention and the materials from which it is constructed allow for easy maintenance and cleaning by the user. The invention and the embodiments described also combine tools for furrowing, measuring planting depth, spacing seeds, planting seeds, and covering seeds into one convenient easy to use garden tool.

The upright position of the invention during the planting process eliminates the need to bend over by the user while planting individual seeds. In the embodiment of the invention wherein the cylinder consists of telescoping or interlocking segments, the length of the invention may be adjusted for the comfort of the user during various uses of the invention. Overall, this reduces the user's fatigue and permits more accurate and consistent planting and seed placement.

As any person skilled in the art will recognize from the previous detailed description and from the figures and claims, what modifications and changes can be made to the preferred embodiments of the invention without departing from the scope of this invention as defined in the following claims.

What is claimed is:

1. A combination seed planter and garden tool comprising:
   (a) an elongate hollow cylinder with an outside surface, an open first end and an open second end;
   (b) a hopper with a major end and a minor open end, the minor open end of said hopper operably attached to the open first end of said elongate hollow cylinder;
   (c) means for furrowing a planting row consisting of a flat V-shaped flange directly attached to the major end of said hopper;
   (d) means for covering a planted seed consisting of a flat rectangular-shaped flange directly attached to the major end of said hopper; and
   (e) a collar, said collar slidably engaged over the outside surface of said elongate hollow cylinder in a manner that allows the collar to slide along the cylinder longitudinally so that the collar may be adjusted up and down to measure depth of a planting row; and attached to said collar, a means for measuring distance between planted seeds, wherein the means to measure distance between seeds is slidably engaged through the collar horizontally to adjust the means for measuring distance.

2. The garden tool of claim 1, wherein the open second end of said elongate hollow cylinder defines a plane, and wherein at least a portion of the plane is oblique to the outside surface of said elongate hollow cylinder.

3. The garden tool of claim 1, wherein said hopper is removably attached to the first open end of said elongate hollow cylinder.

4. The garden tool of claim 1, wherein said hopper includes an internal tray attached inside the major end.

5. The garden tool of claim 4, where the internal tray is removably attached inside said hopper.

6. The garden tool of claim 1 wherein said elongate hollow cylinder is further comprised of at least two smaller, telescopically attached elongate hollow cylinders.

7. The garden tool of claim 1 wherein said elongate hollow cylinder is further comprised of at least two smaller removably interlocking segments.

8. The garden tool of claim 1, wherein said hopper is integrally molded to said hollow elongate cylinder.

9. The garden tool of claim 1, wherein the V-shaped flange and the rectangular-flange sit opposite each other.

* * * * *